US011988900B2

(12) United States Patent
Froissard et al.

(10) Patent No.: US 11,988,900 B2
(45) Date of Patent: May 21, 2024

(54) NOSE SUPPORT FOR EYEGLASSES

(71) Applicant: 3M INNOVATIVE PROPERTIES COMPANY, St. Paul, MN (US)

(72) Inventors: Laurent Froissard, Cottage Grove, MN (US); Keith E. Fecteau, Hudson, WI (US); Gilbert R. Igo, Hugo, MN (US); Jimmy L. Wong, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 286 days.

(21) Appl. No.: 17/638,883

(22) PCT Filed: Sep. 11, 2020

(86) PCT No.: PCT/IB2020/058434
§ 371 (c)(1),
(2) Date: Feb. 28, 2022

(87) PCT Pub. No.: WO2021/053471
PCT Pub. Date: Mar. 25, 2021

(65) Prior Publication Data
US 2022/0276504 A1  Sep. 1, 2022

Related U.S. Application Data

(60) Provisional application No. 62/901,488, filed on Sep. 17, 2019.

(51) Int. Cl.
*G02C 5/12* (2006.01)

(52) U.S. Cl.
CPC ............. *G02C 5/122* (2013.01); *G02C 5/124* (2013.01)

(58) Field of Classification Search
None
See application file for complete search history.

(56) References Cited

U.S. PATENT DOCUMENTS

| | | | |
|---|---|---|---|
| 709,824 A * | 9/1902 | Schild | G02C 5/12 351/72 |
| 5,825,453 A | 10/1998 | Baragar et al. | |
| 6,056,082 A | 5/2000 | Lindgren et al. | |
| 6,364,480 B1 * | 4/2002 | Chen | G02C 5/12 351/80 |
| 6,601,955 B1 * | 8/2003 | Le Van Meautte | G02C 5/122 351/137 |

(Continued)

FOREIGN PATENT DOCUMENTS

| | | |
|---|---|---|
| KR | 20100007969 U | 8/2010 |
| KR | 20130047231 A | 5/2013 |

(Continued)

OTHER PUBLICATIONS

International Search Report for PCT International Application No. PCT/IB2020/058434, mailed on Nov. 11, 2020, 4 pages.

*Primary Examiner* — Darryl J Collins
(74) *Attorney, Agent, or Firm* — Kenneth B. Wood (57) ABSTRACT

A nose support for a pair of eyeglasses is disclosed. The nose support comprises an elongate main body comprising a flexing section which is reversibly deflectable between an unflexed state and a flexed state at a proximal end of the main body, a contact section at a distal end of the main body and a soft resilient organic polymeric shell which encases the main body.

13 Claims, 5 Drawing Sheets

(56) References Cited

U.S. PATENT DOCUMENTS

| | | |
|---|---|---|
| 7,497,570 B2 | 3/2009 | Cohen et al. |
| 7,997,722 B2 | 8/2011 | Gottschling et al. |
| 9,116,364 B2 | 8/2015 | Marini et al. |
| 2011/0109871 A1 | 5/2011 | Chiou et al. |
| 2012/0206690 A1 | 8/2012 | Chen et al. |
| 2012/0236252 A1* | 9/2012 | Wang ..................... G02C 5/122 |
| | | 351/139 |

FOREIGN PATENT DOCUMENTS

| | | |
|---|---|---|
| KR | 20140049379 A | 4/2014 |
| WO | 2005116727 A1 | 12/2005 |

* cited by examiner

NOSE SUPPORT FOR EYEGLASSES

BACKGROUND

Eyeglasses are typically worn for extended periods of time, whether for vision correction, protection from physical hazards, and/or protection from sunlight.

SUMMARY

In broad summary, herein is disclosed a nose support for a pair of eyeglasses, the nose support having a flexing section that is reversibly deflectable between a first, unflexed state and a second, flexed state. In some embodiments the nose support may comprise a soft, resilient organic polymeric shell. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation (e.g., within plus or minus 2% for quantifiable properties. The term "configured to" and like terms is at least as restrictive as the term "adapted to", and requires actual design intention to perform the specified function rather than mere physical capability of performing such a function. All references herein to numerical values (e.g. dimensions, ratios, and so on), unless otherwise noted, are understood to be calculable as average values derived from an appropriate number of measurements of the parameter(s) in question.

Figure 1:
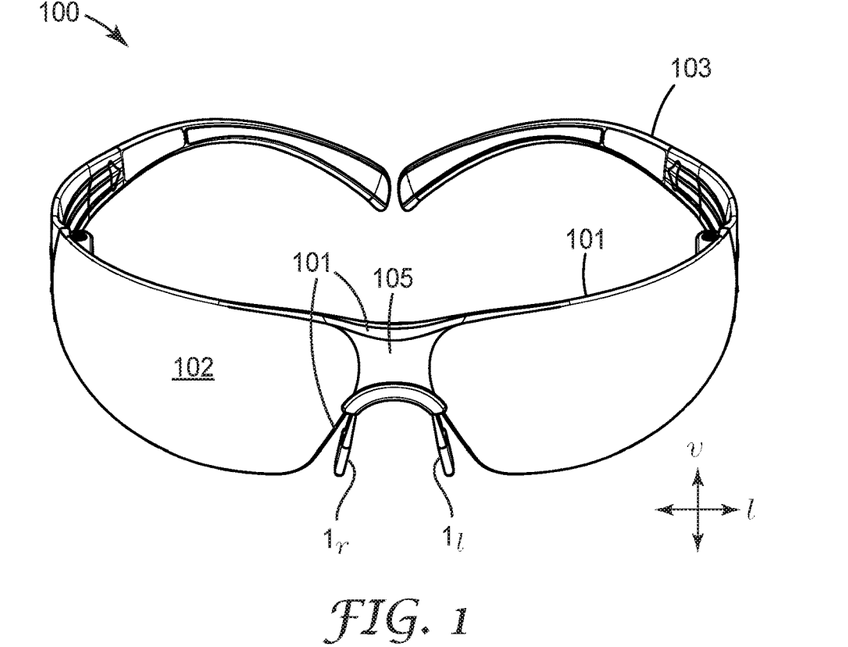
FIG. 1 is a front perspective view of an exemplary pair of eyeglasses comprising exemplary nose supports.
Figure 2:
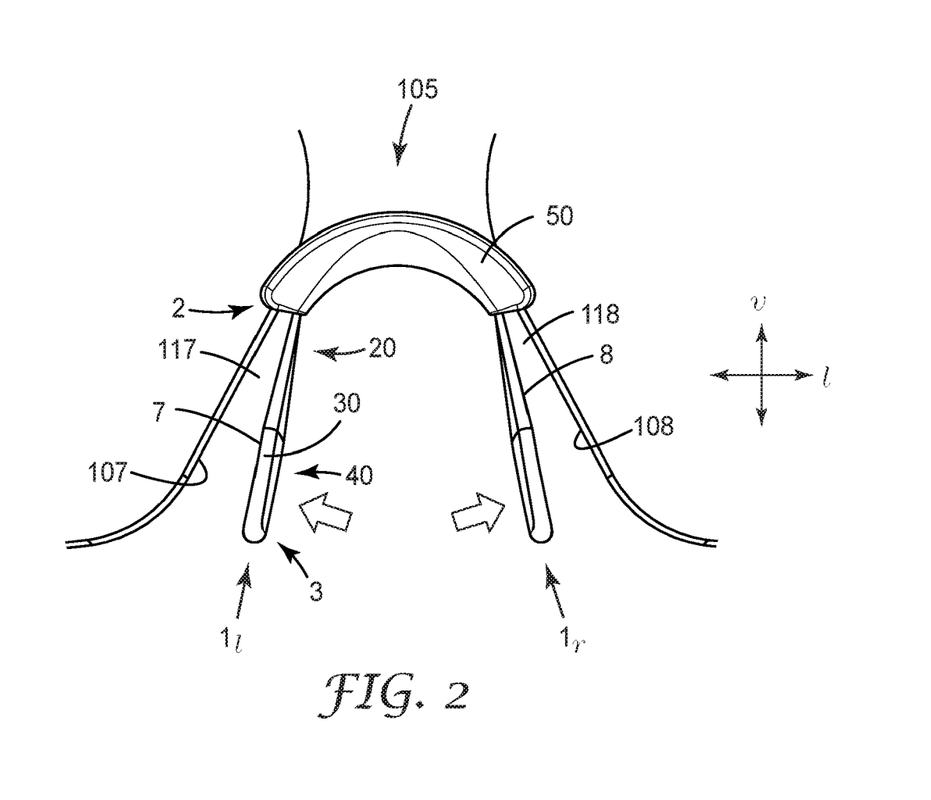
FIG. 2 is a rear view of a bridge portion and nose supports of an exemplary pair of eyeglasses.
Figure 3:
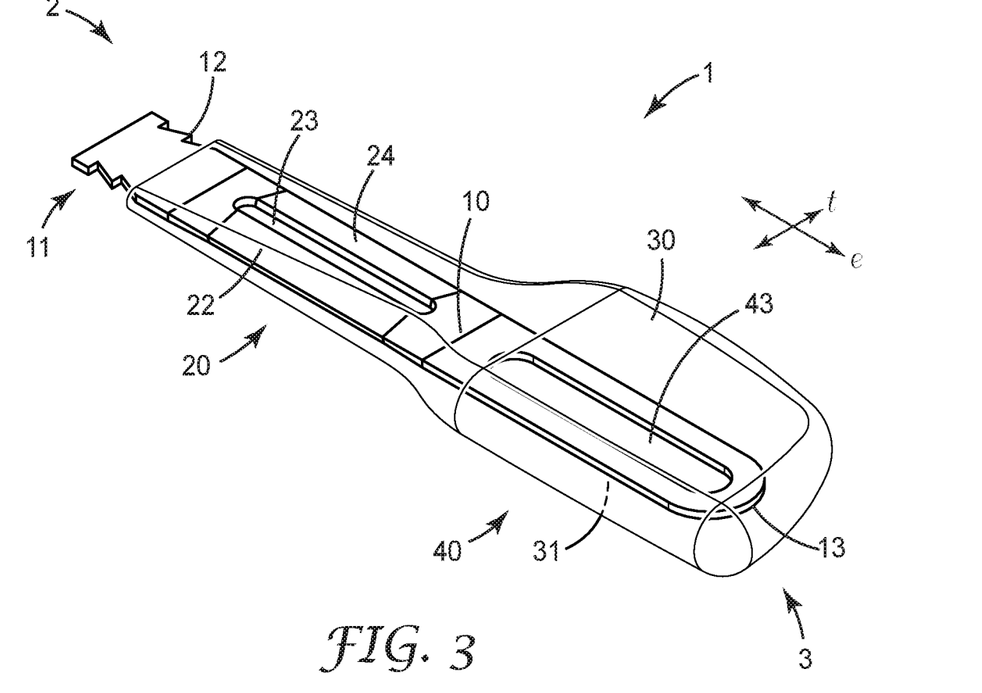
FIG. 3 is an isolated perspective view of an exemplary nose support.

Vertical directions such as up and down, lateral directions such as right and left, and forward and rearward directions, will all be understood to apply to a pair of eyeglasses as conventionally fitted on the head of a human user with the head in an upright condition. For convenience, the vertical (up-down) axis (v) and lateral (left-right) axis (l) of an exemplary pair of eyeglasses are indicated in FIGS. 1 and 2. The term "transverse" specifically applies to a nose support and indicates a direction (which may also be referred to as the "width" direction of the nose support) that is orthogonal to the elongated direction of the nose support and the thickness direction (smallest dimension) of the nose support. For convenience, the elongate (long) axis (e) and transverse axis (t) of an exemplary nose support are indicated in FIG. 3.

DETAILED DESCRIPTION

Disclosed herein is a nose support 1 useful for supporting a pair of eyeglasses 100 on the nose of a wearer. Eyeglasses (often referred to as a "pair" of eyeglasses or glasses) 100 typically comprise two temple arms 103, two lenses 102, and a frame 101, as shown in exemplary manner in FIG. 1. In some embodiments a frame 101 may partially or completely surround (and thus hold from all sides) each lens 102. However, in some embodiments a frame 101 may only partially surround each lens; in particular embodiments a frame 101 may comprise mainly, or only, a bridge portion 105 that is centrally located (positioned directly over the nose of the wearer when the glasses are worn) and that connects the two lenses to each other. Such arrangements are common e.g. in some integrated lens/frame designs (such as the eyeglasses available from 3M Company, St. Paul, MN under the trade designation SECURE-FIT 400 (SF400)). It is thus emphasized that the term "frame" as used herein encompasses not only a frame that completely or partially surrounds the lenses of eyeglasses, but also a frame that consists only of a bridge portion between the lenses of eyeglasses.

Nose supports 1 as disclosed herein are provided in pairs, e.g. a right nose support (from the point of view of the wearer) $1_r$ and a left nose support $1_l$ as indicated in FIG. 1. Such nose supports will contact the sides of the nose and will support a portion of the weight of the eyeglasses in a comfortable manner. Each nose support will be connected, directly or indirectly, to a bridge portion 105 of a frame 101 of eyeglasses 100, as indicated in generic representation in FIG. 1. One particular manner in which nose supports $1_l$ and $1_r$ can be indirectly connected to a bridge portion 105 is shown in exemplary manner in the rear view of FIG. 2 and is discussed in detail later.

An exemplary nose support 1 (which could serve as either a left nose support or a right nose support) is shown in isolated view in FIG. 3. In general, a nose support 1 will be elongated so as to exhibit an elongate (long) axis (e) and will have a proximal end 2 (meaning the end that is closest to, e.g. is connected to, the bridge portion 105 of the eyeglass frame 101) and an opposite, distal end 3 as indicated in FIG. 3.

As evident from FIG. 3, a nose support 1 will comprise an elongate main body 10 with a long axis and with a proximal end 11 (that may provide proximal end 2 of nose support) and an opposing, distal end 13. Main body 10 may be comprised e.g. of an appropriately chosen metal as discussed later. In many embodiments, the main body 10 will be at least partially encased by a soft resilient organic polymeric shell 30, as shown in transparent view in FIG. 3 and as discussed later. Main body 10 is shown in FIG. 4 with shell 30 omitted, for ease of visualization of exemplary components and arrangements of main body 10.

Figure 4:
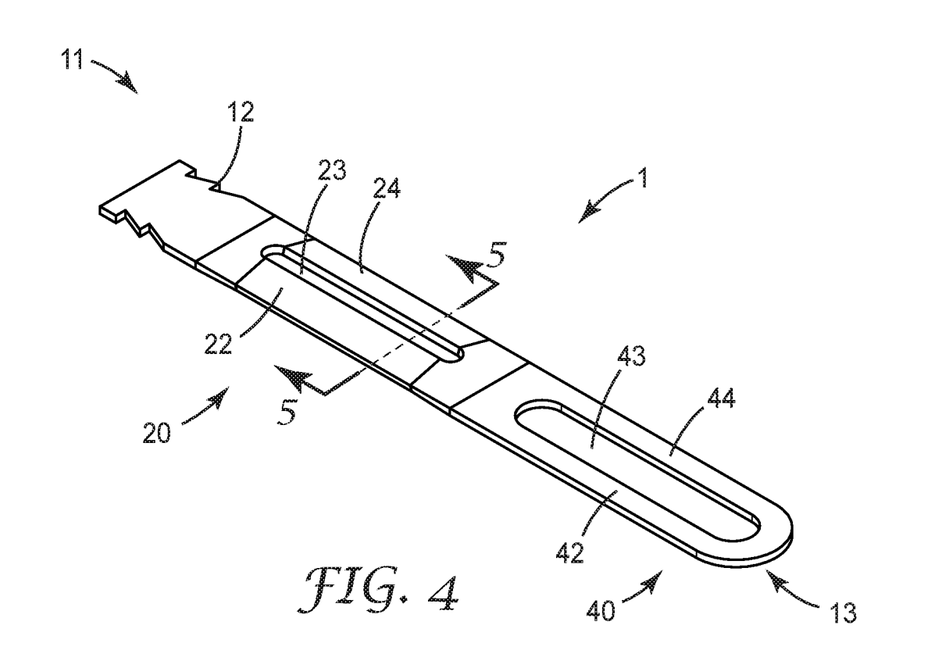
FIG. 4 is an isolated perspective view of an exemplary main body of an exemplary nose support.

Main body 10 will comprise a flexing section 20 as indicated in FIGS. 2-4, that is reversibly deflectable between a first, unflexed state and a second, flexed state so as to provide a flexing section of nose support 1. A first, unflexed state will be one in which essentially no force is present on the nose support, e.g. with the eyeglasses not in place on the nose of a wearer. The flexing section can reversibly enter the second, flexed state upon application of force to the nose support, e.g. through the action of a wearer's nose forcing the nose support laterally outward due to the weight of the eyeglasses urging the nose support down against the wearer's nose.

The ability of the flexing section to deflect in the manner disclosed herein can provide that the nose support does not follow a conventional force-displacement curve in which, for example, the force exerted by the nose support rises rapidly (e.g. exponentially) with increasing displacement (e.g. bending laterally outward) of the nose support. A pair of nose supports as disclosed herein can thus adjust to a variety of nose shapes (in particular, nose widths and angles) thus providing enhanced comfort for the wearer. In particular, such a pair of nose supports may allow the eyeglasses to be held securely on the nose without excessively pinching the nostrils shut.

As shown in exemplary illustration in FIG. 4, in many embodiments a flexing section 20 of a main body 10 of a nose support 1 may comprise first and second elongate ribs 22 and 24 that each extend along the long axis (e) of the nose support and are transversely separated from each other (e.g. along at least 70, 80, 90, or essentially all of their length) by an elongate gap 23. (By gap is meant a through-gap that extends completely through the thickness of flexing section 20.) Gap 23 will thus be located transversely between first and second ribs 22 and 24. In many embodiments, the proximal and distal ends of the ribs may join together (as in the exemplary design of FIG. 3) so that gap 23 is bounded by ribs 22 and 24 (e.g. in combination with other portions of main body 10) along the long-axis and transverse-axis sides of gap 23. In some embodiments each end of gap 23 (i.e. at the proximal end of ribs 22 and 24 where they split apart from each other, and at the distal end of ribs 22 and 24 where they rejoin each other) may be rounded (e.g. with a radius of curvature of at least about 0.1, 0.2, or 0.5 mm) in the general manner illustrated in FIG. 4. Such arrangements may, for example, minimize any stress concentration in these areas.

Figure 5:
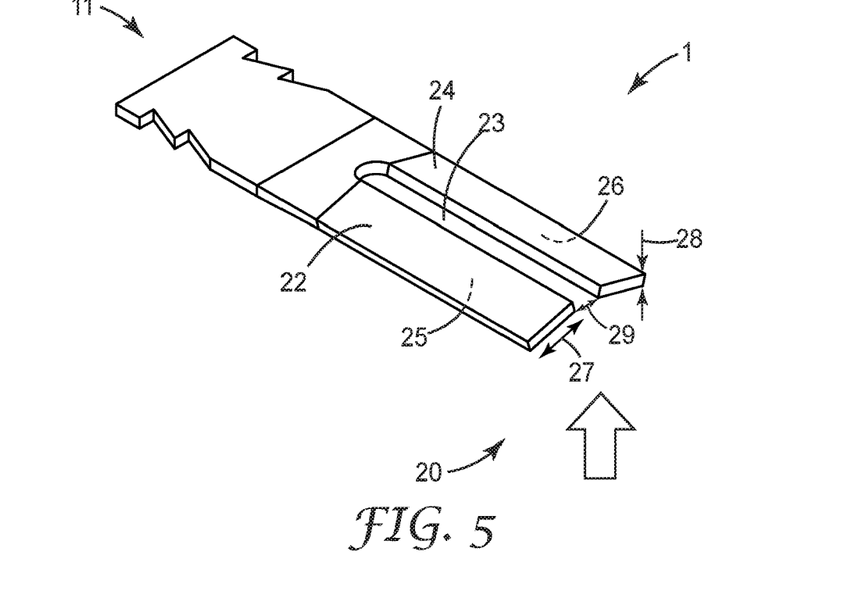
FIG. 5 is an isolated perspective cross-sectional view of the exemplary main body of FIG. 4.
Figure 6:
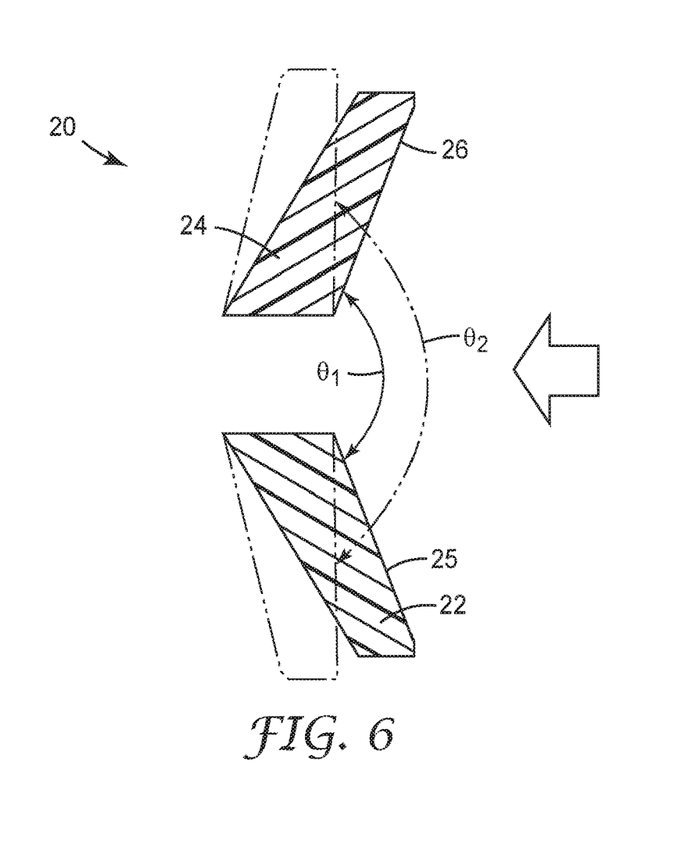
FIG. 6 is a cross-sectional view of an exemplary main body, viewed along the elongated axis of the main body, in an unflexed condition (solid lines) and in a flexed condition (broken lines).

Other features of flexing section 20 of main body 10 are shown in FIG. 5, which is a cross-sectional perspective view of a main body 10 with a distal portion of the flexing section 20 cut away (along the line indicated in FIG. 4) for easier visualization of the features described below. First rib 22 will comprise an inner major surface 25 (i.e., a laterally inward surface, meaning a surface that faces toward the nose of the wearer when the eyeglasses are worn). Second rib 24 will similarly comprise an inner major surface 26. As is evident in FIG. 5, first and second ribs 22 and 24 are purposefully configured so that they are angled relative to each other when in an unflexed condition. This angle may be most easily characterized by way of the inner major surfaces 25 and 26 of ribs 22 and 24. This angle ($\theta_1$) is depicted in FIG. 6, which is a cross-sectional view of a flexing section 20 looking along the elongate axis of the flexing section. The relationship of ribs 22 and 24 when in an unflexed state are shown in solid lines/diagonal fill. As shown, when the ribs are in an unflexed condition the major surfaces 25 and 26 of the first and second ribs will be at an angle $\theta_1$ that is between 120 and 175 degrees (the exemplary angle depicted in FIG. 6 is approximately 150 degrees). In various embodiments this angle may be at least 150, 160, 165, 170, or 172 degrees. In further embodiments this angle may be at most 178, 176, 174, 172, 168, 162, 158, or 155 degrees. The angle will be based on a major plane of major surface 25 and a similar major plane of major surface 26. Even if some slight deviations, surface features, irregularities or the like are present, all that is needed for purpose of such analysis is that a major plane can be identified.

The application of a laterally outward deflecting force to the nose support (e.g. in the manner generally indicated by the block arrows in FIGS. 2, 5 and 6) will cause the first and second ribs to reversibly deflect from their unflexed condition (characterized by angle $\theta_1$) into a flexed condition (characterized by angle $\theta_2$). This deflection will involve the ribs rotating away from their angled, unflexed condition, toward a more coplanar condition. This will be manifested by the angle $\theta$ increasing to an angle $\theta_2$ that approaches (and may equal), but does not substantially exceed, 180 degrees. This is shown in exemplary embodiment (with an angle $\theta_2$ of exactly 180 degrees) in FIG. 6 for ribs 22 and 24 in broken lines/no fill.

By not substantially exceeding is meant that the angle $\theta_2$ that is assumed in a flexed condition will not exceed 180 degrees by more than 10 degrees at any location along the elongate length of the ribs. In particular, the ribs are configured so that under conditions of ordinary use, the ribs will not snap through a planar configuration (i.e. an angle $\theta_2$ of 180 degrees) so as to spontaneously assume, and stably maintain, an angle that is far beyond coplanar. In other words, while at some location along the length of the ribs the ribs may e.g. momentarily exhibit a flexed angle that is slightly beyond 180 degrees, the ribs are configured so that they will not exhibit a so-called "snap-frog" snapover effect as described in U.S. Pat. No. 7,997,722. In some embodiments $\theta_2$ will not exceed 180.0 degrees.

The restraining force that will be present at the proximal and distal ends of the ribs (and that will thus act to limit the degree to which the ribs can twist) can assist in ensuring that the angle $\theta_2$ that is assumed in a flexed condition will be limited to the ranges discussed above. In fact, the restraining force that will be present at the proximal and distal ends of the ribs may provide that the angle that is assumed in the second, flexed state may not be as large at locations near these ends of the ribs as it will be midway along the length of the ribs. Thus, the herein-described angle $\theta_2$ need only occur (or reach a maximum value) at least at some location (e.g. midway) along the elongate length of the first and second ribs. In various embodiments the flexed angle $\theta_2$ may occur (or reach a maximum) over from at least 20, 40, or 60 percent of the elongate length, to at most 95, 90, 80, or 70 percent of the elongate length, of the ribs.

The composition of main body 10 along with the geometric properties of the ribs may be chosen to facilitate the behavior described above. The main body may be comprised of any suitable sheet-like material with appropriate bending modulus. In some embodiments, the main body may be comprised of sheet metal (which includes metal alloys and blends). Such sheet metal may be any suitable metal or metal alloy, e.g. steel, stainless steel, spring steel, beryllium-copper ("spring copper"), titanium, or the like. Specific grades of material that may be suitable include e.g. steels such as SAE 1074, 1064, 1070, and 1095, stainless steels such as Type 17-7, Type 316, Type 304, Type 301, Type 430, and Type 440, beryllium copper of grade C17200 and C17300, and titanium of Grade 5 and Beta C. In various embodiments, any such material may exhibit an elastic modulus of, for example, from 120,000 N/mm$^2$ to 200,000 N/mm$^2$.

The thickness 28 (as indicated in FIG. 5) of ribs 22 and 24 may be any suitable value, e.g. from at least 0.05 mm to at most 0.50 mm. In particular embodiments the ribs may be comprised of sheet metal of thickness 0.15 to 0.35 mm. In many convenient embodiments, the entirety of main body 10, including flexing sections 20 and ribs 22 and 24 thereof, may take the form of a single, integral piece of sheet metal. For example, flat sheet stock or shimstock of suitable material and thickness may be obtained and then formed (e.g. by some combination of stamping, die or laser-cutting, and so on) into a desired shape that includes all portions of main body 10.

Thus in some embodiments ribs 22 and 24 (and, often, all components of main body 10) may exhibit a constant thickness, as in the exemplary design of FIG. 5. However, in some embodiments, the thickness of at least the ribs of the main body may vary. For example, the ribs may be slightly tapered as shown in exemplary embodiment in FIG. 6. (It will be appreciated that some slight tapering may result e.g. from a process of bending, cutting, or otherwise forming the ribs, even if the starting material was of relatively uniform thickness.)

The transverse extent (i.e., width) 27 of ribs 22 and 24 may be any suitable value. In various embodiments, each individual rib may comprise a transverse width of from 0.5 to 1.0 mm. In various embodiments, the total transverse width of the flexing section (ribs plus intervening gap) may be e.g. 2 to 3 mm. The rib width may be chosen in combination with the thickness 28 of the ribs to provide a desired aspect ratio of width to thickness. In various embodiments, this aspect ratio may be at least 3:1, 4:1, 5:1, 6:1, 8:1, or 10:1. In further embodiments, this aspect ratio may be at most 20:1, 15:1, 10:1, or 6:1. The width 27 of ribs 22 and 24 may also be chosen relative to the width 29 of gap 23 therebetween. In various embodiments, the width of each rib 22 and/or 24 may be from 40-80, 80-120, 120-160, 160-200, or 200-240 percent of the width of gap 23 (with the main body in an unflexed condition). By way of specific illustration, the width of rib 22 as depicted in FIG. 5 is approximately 200% of the width of gap 23 (with rib 24 exhibiting a similar value). In some embodiments, ribs 22 and 24 may be of similar or identical width. In other embodiments, the ribs may differ in width, e.g. from at least 5, 10, or 20%, to at most 100, 60, or 40%. In some embodiments, a rib may exhibit a width that is at least generally, substantially or essentially constant along its length. In other embodiments, the width of a rib may vary e.g. at least 10, 20 or 40% along its length.

The rib length (which will generally correspond to the distance from the proximal end of gap 23 to the distal end of gap 23) can be any suitable value. For example, in some embodiments each rib may exhibit a length of at least 2.0, 2.5, or 3.0 mm. In further embodiments each rib may exhibit a length of at most 6.0, 5.5, 5.0, 4.5, or 4.0 mm.

In some embodiments, a main body 10 may comprise a contact section 40 that is distal to flexing section 20 and that provides a contact section of nose support 1. In many convenient embodiments, main body 10 may take the form of a single, integral piece with the contact section 40 extending integrally from the flexing section along the elongate axis of the support as in the exemplary design of FIG. 3. Contact section 40 may thus provide the primary location at which contact between the nose support 1 and the wearer's nose occurs (i.e. a contact section of the nose support). However, it is specifically noted that in at least some instances (e.g. depending on the shape of the wearer's nose) at least some portion of a flexing section of the nose support may also contact the nose.

In some embodiments, a contact section 40 of main body 10 may be configured so that it does not deflect in the same manner, and/or to the same extent, as flexing section 20. In some embodiments the junction between a flexing section 20 and a contact section 40 may be readily apparent, e.g. resulting in a rather abrupt step change in the bending properties, e.g. as in the design of FIG. 3. However, in some embodiments the junction between such sections may be more gradual than the exemplary arrangement of FIG. 3. In particular embodiments, a flexing section 20 may extend along generally, substantially, or essentially the entire elongate length of main body 10. In such cases a distal portion of the flexing section 20 may serve as a contact section of the main body.

In some embodiments, a contact section 40 may be at least generally coplanar with flexing section 20. In some embodiments a contact section 40 may comprise first and second elongate beams 42 and 44 as shown in exemplary illustration in FIG. 3. In some embodiments such beams may be coplanar with each other, e.g. along at least 40, 60, 80, or essentially 100% of the elongate length of the beams. In some embodiments the first beam 42 may be an integral extension of the first rib 22 and the second beam 44 may be an integral extension of the second rib 24. In some embodiments a contact section 40 of main body 10 may comprise generally, substantially, or essentially the same transverse extent (width) as flexing section 20, as in the exemplary design of FIG. 4. However, in other embodiments contact section may be at least 20, 40, 60, 80, or 100% wider than the transverse width of the flexing section.

Figure 7:
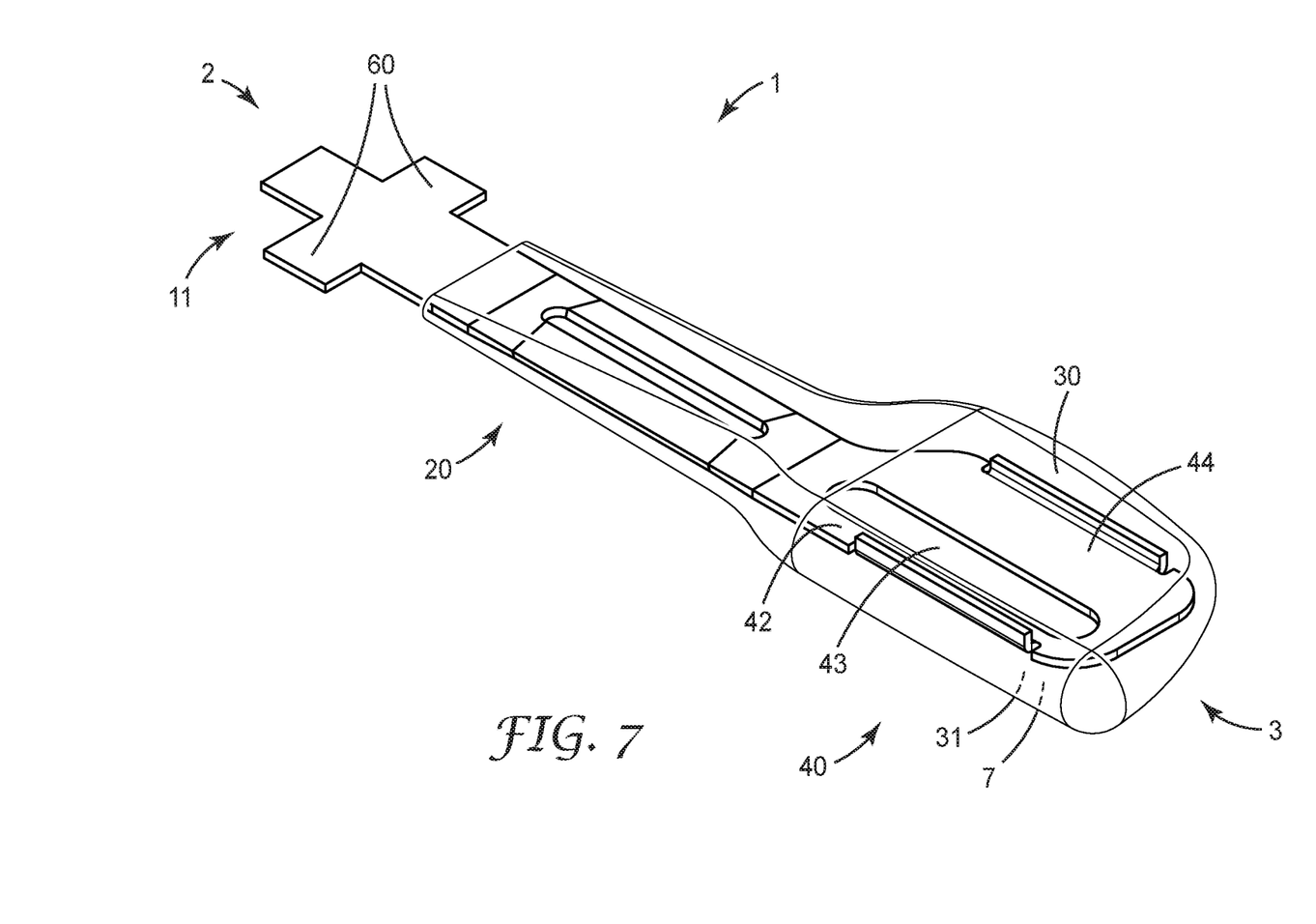
FIG. 7 is an isolated perspective view of another exemplary nose support.

An alternative to the contact section of FIG. 3 is depicted in exemplary embodiment in FIG. 7. In this nose support, the contact section 40 is significantly wider than the flexing section 20 (and expands asymmetrically relative to the flexing section). Also, in this nose support the contact section includes two small flanges (unnumbered) that can add stiffness to the contact section to enhance the degree to which any bending of the nose support occurs in the flexing section. Other features of the nose supports of FIG. 7 are discussed later herein.

In some embodiments contact section 40 may define at least one through-opening (e.g. gap) 43 as indicated in exemplary embodiment in FIGS. 2, 3 and 7. The size of any such through-opening or openings may be chosen as desired, e.g. to influence the flexibility (or lack thereof) of the contact section. Furthermore, any suitable features (e.g. reinforcing flanges or the like) may be included in the contact section, for any purpose.

A main body 10 will comprise a proximal end 11 that is located at (and, in many instances, will provide) a proximal end 2 of nose support 1. Proximal end 11 of main body 10 is configured to be connected, directly or indirectly, to bridge portion 105 of frame 101 of eyeglasses 100. Proximal end 11 may comprise any suitable features (e.g. one or more barbs 12, as visible in FIG. 3) to facilitate such connection. In some embodiments, proximal end 11 may be connected directly to bridge portion 105; in other embodiments, proximal end 11 may be connected to some other component (e.g. a support holder 50 as discussed later) that is itself connected to bridge portion 105.

In at least some embodiments, a nose support 1 will comprise a soft resilient organic polymeric shell 30 as shown in exemplary embodiment in FIGS. 2, 3 and 7 (noting that shell 30 is shown semi-transparent (in wire-frame outline) in FIGS. 3 and 7). In various embodiments, such a shell may encase at least 20, 40, 60, 80, 90, 95, or essentially 100% of the elongate length of flexing section 20, i.e. of ribs 22 and 24. In various embodiments, such a shell may occupy (i.e., may physically fill) at least 20, 40, 60, 80, 90, 95, or essentially 100% of the elongate length of gap 23 between ribs 22 and 24. In some embodiments, such a shell may also encase at least 20, 40, 60, 80, 90, 95, or essentially 100% of the elongate length of a contact section 40. Such a shell may similarly occupy at least 20, 40, 60, 80, 90, 95, or essentially 100% of the elongate length of a through-opening 43 of a contact section 40. It will be appreciated that the presence of one or more gaps in main body 10, into which the shell material can infill, can enhance the security with which shell 30 is held in place on main body 10.

An outer surface 31 of shell 30 will provide the surface (e.g. a contact surface 7 as discussed later herein) of the nose support that actually contacts the wearer's nose. The presence of the shell 30 can thus enhance the comfort experienced by the wearer of eyeglasses 100. However, in many embodiments such a shell 30 may encase e.g. a substantial portion of ribs 22 and 24 of flexing section 20 and/or may occupy e.g. a substantial portion of gap 23 therebetween. (The herein-disclosed configurations will thus be distinguished from, for example, an arrangement of ribs that comprise an empty (i.e. air-filled) gap therebetween.)

This being the case, shell 30 must thus be configured so that the presence of the shell does not unduly interfere with the flexing (e.g. twisting) of ribs 22 and 24 as described herein. Accordingly, any such shell 30 must be comprised of a soft material, with soft being defined as exhibiting a Shore A hardness of less than 70. In various embodiments shell 30 may exhibit a Shore A hardness of less than 65, 60, 55, 50, or 45. In further embodiments shell 30 may exhibit a Shore A hardness of at least 10, 15, 20, 25, or 30. Such softness can also enhance the comfort experienced by the wearer of eyeglasses 100.

Shell 30 may be comprised of any suitable material that exhibits the requisite softness. Suitable materials may be chosen from e.g. PVC (e.g. plasticized PVC), silicones, polyurethanes (e.g. the material available under the trade designation SORBOTHANE), synthetic rubbers, and the like. In some embodiments the material of shell 30 may be non-porous (with the softness of the material thus being provided by the inherent properties of the material). In other embodiments the material of shell 30 may be porous, which may contribute to the overall softness (as manifested by a Shore A hardness value of the porous shell material) of the shell. Thus in some embodiments a shell 30 may be comprised of e.g. a closed-cell foam or an open-cell foam.

A shell 30 may be disposed on main body 10, e.g. encasing a desired portion or portions of main body 10, in any desired manner. In some embodiments a shell 30 may be molded and then may be physically slipped onto main body 10. However, in some convenient embodiments a shell 30 may be overmolded onto main body 10. In other embodiments a shell may be e.g. dip-coated onto main body 10. For any such operation, the material that is used to produce shell 30 may take any suitable form, e.g. a thermoplastic injection-moldable resin, a thermoset injection-moldable resin (e.g. a platinum-cure silicone), a plastisol, and so on.

In some embodiments, a shell may encase essentially the entirety of the contact section 40 and/or the flexing section 20 of main body 10, as shown in exemplary embodiment in FIGS. 3 and 7. However, also as shown in FIGS. 3 and 7, in some embodiments it may be desired that proximal end 11 of main body 10 is not encased within shell 30. In other words, in such embodiments such a shell 30 may terminate at some location between flexing section 20 and the terminal edge of proximal end 11 of main body 10. This may enhance the ability to attach proximal end 11 of main body 10 to any desired item (e.g. to a bridge portion 105 of an eyeglasses frame 101, or to a support holder that is attached thereto) without undue interference by the shell.

Left and right nose supports may be connected, directly or indirectly, to bridge portion 105 of frame 101 of eyeglasses 100 in any suitable manner. In some embodiments the proximal end of each nose support may be directly connected to bridge portion 105. This may, for example, be accomplished by seating the proximal end of each main body in a receptacle in bridge portion 105 that is provided for this purpose. In some embodiments such a connection may be secured e.g. by the use of a suitable adhesive, potting compound, or the like. However, in some embodiments such a connection may be assisted and/or achieved by e.g. ultrasonic welding, solvent welding, or by a mechanical connection. As mentioned earlier, proximal end 11 of main body 10 may be equipped with one or more barbs 12 to enhance the strength and/or durability of the connection achieved.

In some embodiments the proximal end of each main body may be connected to a support holder 50 which is itself connected to bridge portion 105 of frame 101 of eyeglasses 100, as shown in exemplary embodiment in FIG. 2. This connection may be achieved by any of the methods referred to above, e.g. seating the proximal end of the main body in a receptacle provided in support holder 50 for this purpose, e.g. assisted by adhesive or any other suitable mechanism. In some embodiments, the connection of the main bodies to support holder 50 may be permanent, i.e. the main bodies are not disconnectable from support holder 50 without damaging or destroying the nose supports and/or the support holder.

In some embodiments, a support holder 50 may be removably, or non-removably, connectable to bridge portion 105 of frame 101. For example, in some embodiments support holder may be removably attachable to bridge portion 105 by way of being snap-fittable onto the bridge portion (with holder 50 being held in place by a friction-fit until sufficient force is applied to remove it).

Figure 8:
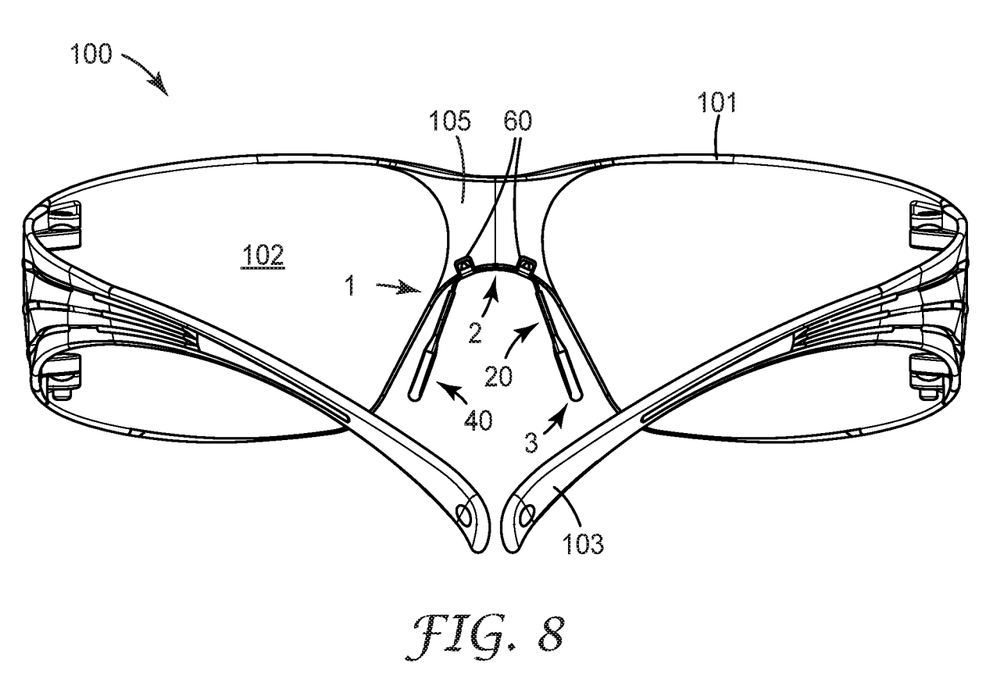
FIG. 8 is a rear perspective view of an exemplary pair of eyeglasses comprising exemplary nose supports.

In some embodiments (e.g. as illustrated in exemplary embodiment in FIG. 7) a proximal end 11 of a main body 10 may be provided with a set of deformable tabs 60. Such tabs may be configured so that they can be crimped onto bridge portion 105 (e.g. into receptacles provided therein) so as to connect main body 10 to bridge portion 105. In some embodiments of this general type, a left nose support and a right nose support may be provided by portions of a single entity in which the left and right main bodies are right and left sections of a single, integral main body. Such a single, integral main body may resemble the exemplary device shown in FIG. 7 except including an additional main body section that may be a mirror image of the depicted main body section, and that integrally extends from the proximal end 11 of the depicted main body. Such a single, integral main body may comprise one or more sets of tabs 60 that allow the single, integral main body to be connected to a bridge portion 105 so that the single, integral main body (e.g. partially encased by a polymeric shell 30) provides right and left nose supports. It will thus be appreciated that in some embodiments right and left nose supports, and in particular the main bodies thereof, do not necessarily have to take the form of physically separate items. An exemplary set of right and left nose supports formed from portions of a single, integral main body of the general type described above (and that is attached to a bridge portion 105 of a frame 101 by crimping tabs 60 into receptacles in bridge portion 105) is shown in exemplary embodiment in FIG. 8.

Regardless of the manner in which they are directly or indirectly connected to a bridge portion 105 of a frame 101 of eyeglasses 100, left and right nose supports $1_l$ and $1_r$ will be arranged to facilitate comfortable wearing of eyeglasses 100. Often, in order to accommodate the shape of a human nose, left and right nose supports $1_l$ and $1_r$ will be laterally diverging as shown in exemplary embodiment in FIG. 2. By this is mean that the nose supports will laterally diverge from each other with distance away from bridge portion 105, so that lowermost (distal) ends 3 of the nose supports will be further apart from each other than uppermost (proximal) ends 2 of the nose supports. The nose supports (which will often be straight, i.e. exhibiting a radius of curvature approaching infinity when in an unflexed condition) may be positioned at any suitable angle relative to each other. In the exemplary arrangement of FIG. 2 the supports are positioned at an angle in the range of approximately 20 degrees. In various embodiments, such supports may be positioned at an angle of from at least 10, 15, 20, 25, or 30 degrees, to a most 70, 60, 50 or 40 degrees.

It will be appreciated that each nose support should be positioned so that there is a lateral gap present between a laterally outer face of the nose support and a portion of the eyeglasses frame that faces the nose support, in order for the herein-described flexing to be allowed to occur. That is, there must be physical space for the nose support to flex/move without being prevented from moving by the eyeglasses frame.

Thus, as denoted in FIG. 2, a left lateral gap 117 may be provided between laterally outer surface 7 of left nose support 1 and the nose-facing surface 107 of a left-lens portion of frame 101. Similarly, a right lateral gap 118 may be provided between laterally outer surface 8 of right nose support 1 and the nose-facing surface 108 of a right-lens portion of frame 101. Such a gap may exhibit any desired magnitude and geometry. In some embodiments, such a gap may be a diverging gap, meaning that the width of the gap increases as the distal end 3 of the nose support is approached, as in the exemplary design of FIG. 2.

Nose supports 1 as disclosed herein may be used with any type of eyeglasses, including but not limited to eyeglasses (spectacles) configured for vision correction, eyeglasses configured for physical protection (e.g. safety glasses), eyeglasses configured for protection from radiation (e.g. sunglasses or eyeglasses for laser protection) and combinations of any of these (e.g. eyeglasses for welding) Examples of specific types of eyeglasses with which such nose supports may be used include those for nearsightedness, those for farsightedness, reading glasses, computer glasses, anti-glare glasses, bifocal and trifocal glasses, progressive-lens glasses, 3-D glasses, and so on. As noted, such eyeglasses may be of any suitable design, including but not limited to designs in which a frame of the eyeglasses fully or partially surrounds the lenses of the eyeglasses, and those in which the frame consists essentially of only a bridge portion.

It will be appreciated that in at least some embodiments in which left and right nose supports are removably connectable to an eyeglasses frame (e.g. by way of being connected to a support holder that is e.g. snap-fittable to the frame), such nose supports can offer significant advantages. For example, if a nose support is broken or damaged beyond repair it can be removed and replaced without the necessity of using special tools and/or processes such as welding, soldering or the like. Furthermore, nose supports may be provided as modules that can be successively connected onto eyeglasses and fitted to a wearer in order for the wearer to determine which arrangement offers the highest comfort. Such nose supports may thus be produced that differ e.g. in the diverging angle of the nose supports, the length of the nose supports, the flexural rigidity of the flexing section of the nose supports, and so on. An inventory of such items may be maintained in order for a wearer to make the most appropriate selection.

Exemplary Embodiments and Combinations

A first exemplary embodiment is a nose support for a pair of eyeglasses, the nose support being elongated with an elongate axis and a proximal end and a distal end and comprising a main body with at least one flexing section that is reversibly deflectable between a first, unflexed state and a second, flexed state; wherein the flexing section comprises first and second elongate ribs that each extend along the elongate axis of the nose support and are transversely separated from each other by an elongate gap located transversely between the first and second ribs, the first elongate rib comprising a first generally planar inner major surface and the second elongate rib comprising a second generally planar inner major surface, wherein when the flexing section is in the first, unflexed state the first and second inner major surfaces of the first and second ribs are positioned at an angle $\theta_1$ that is between 120 and 175 degrees, and when the flexing section is in the second, flexed state the first and second inner major surfaces are positioned at an angle $\theta_2$ that is greater than $\theta_1$ and that does not substantially exceed 180 degrees, at least at some location along the elongate extent of the first and second ribs; and, wherein the nose support comprises a soft resilient organic polymeric shell that encases at least 80% of an elongate length of the first and second elongate ribs and that occupies at least 80% of an elongate length of the elongate gap between the ribs.

A $2^{nd}$ exemplary embodiment is the nose support of embodiment 1 wherein the soft resilient organic polymeric shell encases the entirety of the flexing section of the main body of the nose support.

Embodiment 3 is the nose support of any of embodiments 1-2 wherein the main body is in the form of a single, integral piece of sheet metal.

Embodiment 4 is the nose support of embodiment 3 wherein the main body further comprises a contact section that is distal to the flexing section and that extends integrally from the flexing section along the elongate axis of the nose support.

Embodiment 5 is the nose support of embodiment 4 wherein the contact section of the main body comprises first and second elongate beams, wherein the first elongate beam is an integral extension of the first elongate rib and wherein the second elongate beam is an integral extension of the second elongate rib.

Embodiment 6 is the nose support of any of embodiments 4-5 wherein the contact section of the main body exhibits a transverse width that is at least 20% wider than a transverse width of the flexing section of the main body.

Embodiment 7 is the nose support of any of embodiments 4-5 wherein the resilient organic polymeric shell encases the entirety of the flexing section of the main body of the nose support and the entirety of the contact section of the main body of the nose support so that a major surface of a portion of the soft resilient organic polymeric shell provides a contact surface of a contact section of the nose support.

Embodiment 8 is the nose support of embodiment 7 wherein the contact section of the main body defines at least one through-opening, and wherein the soft resilient organic polymeric shell occupies the entirety of the at least one through-opening.

Embodiment 9 is the nose support of any of embodiments 1-8 wherein a proximal end of the nose support is provided by a proximal end of the main body, which proximal end of the main body is not encased by the soft resilient organic polymeric shell.

Embodiment 10 is the nose support of embodiment 9 wherein the proximal end of the main body comprises one or more barbs.

Embodiment 11 is the nose support of any of embodiments 1-10 wherein the first and second ribs each comprise an aspect ratio of transverse width to thickness of at least 4:1.

Embodiment 12 is a pair of eyeglasses configured to be worn by a user, the eyeglasses comprising a frame that supports first and second lenses, wherein the pair of eyeglasses comprises a left nose support that is a nose support as claimed in any of embodiments 1-11 and a right nose support that is a nose support as claimed in any of embodiments 1-11, wherein the left and right nose supports are downwardly laterally diverging with a proximal end of each nose support being directly or indirectly connected to a bridge portion of the frame of the eyeglasses.

Embodiment 13 is the pair of eyeglasses of embodiment 12 wherein a left lateral gap is present between a laterally outer face of the left nose support and a nose-facing portion of a left-lens portion of the frame of the eyeglasses, and wherein a right lateral gap is present between a laterally outer face of the right nose support and a nose-facing portion of a right-lens portion of the frame of the eyeglasses.

Embodiment 14 is the pair of eyeglasses of any of embodiments 12-13 wherein the proximal end of the left nose support is directly connected to the bridge portion of the frame of the eyeglasses wherein the proximal end of the right support is directly connected to the bridge portion of the frame of the eyeglasses.

Embodiment 15 is the pair of eyeglasses of any of embodiments 12-13 wherein the proximal end of the left nose support is directly connected to a support holder and wherein the proximal end of the right support is directly connected to the support holder, and wherein the support holder is removably or non-removably attached to a bridge portion of the frame.

Embodiment 16 is the pair of eyeglasses of embodiment 15 wherein the support holder is removably attached to the bridge portion of the frame by way of being snap-fitted onto the bridge portion of the frame.

Embodiment 17 is the pair of eyeglasses of embodiment 15 wherein the proximal end of the left nose support is directly connected to the bridge portion of the frame of the eyeglasses by a first set of tabs that are crimped onto the bridge portion of the frame, and wherein the proximal end of the right nose support is directly connected to the bridge portion of the frame of the eyeglasses by a second set of tabs that are crimped onto the bridge portion of the frame.

Embodiment 18 is the pair of eyeglasses of any of embodiments 12-13 wherein the left nose support and the right nose support are respectively provided by left and right sections of a single, integral main body comprising a central portion that is directly or indirectly connected to a bridge portion of the frame of the eyeglasses and that provides the proximal ends of the left and right nose supports and that is not encased within a soft resilient organic polymeric shell; and, wherein the left section of the single, integral main body comprises a left flexing section and a left contact section that are encased within a left soft resilient organic polymeric shell and wherein the right section of the single, integral main body comprises a right flexing section and a right contact section that are encased within a right soft resilient organic polymeric shell.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document that is incorporated by reference herein but to which no priority is claimed, this specification as written will control.

What is claimed is:

1. A nose support for a pair of eyeglasses, the nose support being elongated with an elongate axis and a proximal end and a distal end and comprising a main body with at least one flexing section that is reversibly deflectable between a first, unflexed state and a second, flexed state;

wherein the flexing section comprises first and second elongate ribs that each extend along the elongate axis of the nose support and are transversely separated from each other by an elongate gap located transversely between the first and second ribs, the first elongate rib comprising a first generally planar inner major surface and the second elongate rib comprising a second generally planar inner major surface, wherein when the flexing section is in the first, unflexed state the first and second inner major surfaces of the first and second ribs are positioned at an angle $\theta_1$ that is between 120 and 175 degrees, and when the flexing section is in the second, flexed state the first and second inner major surfaces are positioned at an angle $\theta_2$ that is greater than $\theta_1$ and that does not substantially exceed 180 degrees, at least at some location along the elongate extent of the first and second ribs;

wherein the nose support comprises a soft resilient organic polymeric shell that encases at least 80% of an elongate length of the first and second elongate ribs and that occupies at least 80% of an elongate length of the elongate gap between the ribs; and wherein the main body is in the form of a single, integral piece of sheet metal and the main body further comprises a contact section that is distal to the flexing section and that extends integrally from the flexing section along the elongate axis of the nose support.

2. The nose support of claim 1 wherein the soft resilient organic polymeric shell encases the entirety of the flexing section of the main body of the nose support.

3. The nose support of claim 1 wherein the contact section of the main body comprises first and second elongate beams, wherein the first elongate beam is an integral extension of the first elongate rib and wherein the second elongate beam is an integral extension of the second elongate rib.

4. The nose support of claim 1 wherein the contact section of the main body exhibits a transverse width that is at least 20% wider than a transverse width of the flexing section of the main body.

5. The nose support of claim 1 wherein the resilient organic polymeric shell encases the entirety of the flexing section of the main body of the nose support and the entirety of the contact section of the main body of the nose support so that a major surface of a portion of the soft resilient organic polymeric shell provides a contact surface of a contact section of the nose support.

6. The nose support of claim 5 wherein the contact section of the main body defines at least one through-opening, and wherein the soft resilient organic polymeric shell occupies the entirety of the at least one through-opening.

7. The nose support of claim 1 wherein a proximal end of the nose support is provided by a proximal end of the main body, which proximal end of the main body is not encased by the soft resilient organic polymeric shell.

8. The nose support of claim 7 wherein the proximal end of the main body comprises one or more barbs.

9. The nose support of claim 1 wherein the first and second ribs each comprise an aspect ratio of transverse width to thickness of at least 4:1.

10. A pair of eyeglasses configured to be worn by a user, the eyeglasses comprising a frame that supports first and second lenses, wherein the pair of eyeglasses comprises a left nose support that is a nose support as claimed in claim 1 and a right nose support that is a nose support as claimed in claim 1, wherein the left and right nose supports are downwardly laterally diverging with a proximal end of each nose support being directly or indirectly connected to a bridge portion of the frame of the eyeglasses, wherein the proximal end of the left nose support is directly connected to a support holder and wherein the proximal end of the right support is directly connected to the support holder, and wherein the support holder is removably attached to the bridge portion of the frame by way of being snap-fitted onto the bridge portion of the frame.

11. The pair of eyeglasses of claim 10 wherein a left lateral gap is present between a laterally outer face of the left nose support and a nose-facing portion of a left-lens portion of the frame of the eyeglasses, and wherein a right lateral gap is present between a laterally outer face of the right nose support and a nose-facing portion of a right-lens portion of the frame of the eyeglasses.

12. The pair of eyeglasses of claim 10 wherein the left nose support and the right nose support are respectively provided by left and right sections of a single, integral main body comprising a central portion that is directly or indirectly connected to a bridge portion of the frame of the eyeglasses and that provides the proximal ends of the left and right nose supports and that is not encased within a soft resilient organic polymeric shell;
and,
wherein the left section of the single, integral main body comprises a left flexing section and a left contact section that are encased within a left soft resilient organic polymeric shell and wherein the right section of the single, integral main body comprises a right flexing section and a right contact section that are encased within a right soft resilient organic polymeric shell.

13. A nose support for a pair of eyeglasses, the nose support being elongated with an elongate axis and a proximal end and a distal end and comprising a main body with at least one flexing section that is reversibly deflectable between a first, unflexed state and a second, flexed state;
wherein the flexing section comprises first and second elongate ribs that each extend along the elongate axis of the nose support and are transversely separated from each other by an elongate gap located transversely between the first and second ribs, the first elongate rib comprising a first generally planar inner major surface and the second elongate rib comprising a second generally planar inner major surface,
wherein when the flexing section is in the first, unflexed state the first and second inner major surfaces of the first and second ribs are positioned at an angle $\theta_1$ that is between 120 and 175 degrees, and when the flexing section is in the second, flexed state the first and second inner major surfaces are positioned at an angle $\theta_2$ that is greater than $\theta_1$ and that does not substantially exceed 180 degrees, at least at some location along the elongate extent of the first and second ribs;
wherein the nose support comprises a soft resilient organic polymeric shell that encases at least 80% of an elongate length of the first and second elongate ribs and that occupies at least 80% of an elongate length of the elongate gap between the ribs;
wherein a proximal end of the nose support is provided by a proximal end of the main body, which proximal end of the main body is not encased by the soft resilient organic polymeric shell, and wherein the proximal end of the main body comprises one or more barbs.

* * * * *